United States Patent

Dike et al.

[11] Patent Number: 5,434,892
[45] Date of Patent: Jul. 18, 1995

[54] THROTTLING CIRCUIT FOR A DATA TRANSFER SYSTEM

[75] Inventors: Charles E. Dike, Hillsboro; Jerry G. Jex, Forest Grove, both of Oreg.

[73] Assignee: Intel Corporation, Santa Clara, Calif.

[21] Appl. No.: 307,502

[22] Filed: Sep. 16, 1994

[51] Int. Cl.⁶ .............................................. H04L 23/00
[52] U.S. Cl. .................................... 375/377; 395/250; 395/275
[58] Field of Search .......................... 370/60, 61, 94.1; 375/121, 377

[56] References Cited

U.S. PATENT DOCUMENTS

| | | | |
|---|---|---|---|
| 4,276,611 | 6/1981 | Jansen et al. | 364/900 |
| 4,525,849 | 6/1985 | Wolf | 375/118 |
| 5,121,480 | 6/1992 | Bonke et al. | 395/250 |
| 5,241,630 | 8/1993 | Lattin, Jr. et al. | 395/325 |

FOREIGN PATENT DOCUMENTS 0127007  3/1984  European Pat. Off. .

*Primary Examiner*—Stephen Chin
*Assistant Examiner*—William Luther
*Attorney, Agent, or Firm*—Blakely, Sokoloff, Taylor & Zafman

[57] ABSTRACT

A data transfer system includes a buffer for storing data to be transferred out of the buffer and a register circuit coupled to the buffer for receiving the data from the buffer. The buffer generates a first indication signal when the buffer is almost empty. The buffer generates a second indication signal when the buffer is empty. The register circuit generates a request signal to receive the data from the buffer. The data transfer system further includes a throttling circuit coupled to the buffer and the register circuit for throttling data transmission to the register circuit from the buffer when the buffer generates the first indication signal and for stopping data transmission to the register circuit from the buffer when the buffer generates the second indication signal. The throttling circuit receives the first and second indication signals and the request signal. The throttling circuit maintains maximized data transfer rate between the buffer and the register circuit while immediately stopping the data transfer between the buffer and register circuit when the buffer is empty.

5 Claims, 3 Drawing Sheets

THROTTLING CIRCUIT FOR A DATA TRANSFER SYSTEM

FIELD OF THE INVENTION

The present invention pertains to the field of data transfer systems. More particularly, this invention relates to a throttling circuit for a data transfer system that includes a first-in-first-out ("FIFO") buffer for storing data and a data register for receiving the data from the FIFO buffer, wherein the throttling circuit prevents the data register from reading data from the FIFO buffer after a last data packet of the data is read from the FIFO buffer to the data register.

BACKGROUND OF THE INVENTION

A prior art data processing system, for example a computer system, typically includes a number of components, each operating under an independent clock. When this occurs, each of the components of the data processing system typically transfers data at its own data transfer rate which is based on the clock of the respective component. Therefore, when data transfer is required between two components of different data transfer rates of the data processing system, a FIFO buffer is typically used that receives the data from a transmitting component at the data transfer rate of the transmitting component and sends the data to the receiving component at the data transfer rate of the receiving component.

When, however, the FIFO buffer does not contain any data to be transferred to the receiving component (i.e., empty), the receiving component is required to immediately stop reading data from the FIFO buffer in order to prevent invalid data to be transferred from the FIFO buffer to the receiving component. One prior art arrangement for stopping the data transfer when the FIFO buffer is empty is to reduce the data transfer rate between the FIFO buffer and the receiving component such that the empty condition in the FIFO buffer can be detected between any two data fetch cycles. Another prior art arrangement is illustrated in FIG. 1 which is described below.

Referring to FIG. 1, a data transfer system 10 is shown which includes a FIFO buffer 11 and a register circuit 13. FIFO buffer 11 is used to transfer data to register circuit 13 via bus 14. Register circuit 13 receives data from FIFO buffer 11 at a data transfer rate of register circuit 13. Register circuit 13 sends a request signal REQ to FIFO buffer 11 to control the data transfer from FIFO buffer 11 to register circuit 13. The REQ signal initiates each data fetch cycle.

FIFO buffer 11 also includes a counter 15. Counter 15 is used to generate a CONTROL signal. Counter 15 counts the number of data words or packets remaining in FIFO buffer 11. When counter 15 counts to zero, counter 15 asserts the CONTROL signal.

The CONTROL signal is applied to a breaking circuit 12. Breaking circuit 12 is also connected to register circuit 13 for receiving the REQ signal. Breaking circuit 12 generates an acknowledge signal ACK to FIFO buffer 11 and register circuit 13 in response to the REQ signal. Breaking circuit 12 asserts the ACK signal every time the REQ signal is asserted when the CONTROL signal is not asserted. Whenever the ACK signal is asserted, FIFO buffer 11 starts a data transfer cycle to transfer a data word or packet to register circuit 13. When, however, the CONTROL signal is asserted, breaking circuit 12 maintains the ACK signal deasserted regardless of the REQ signal. As described above, counter 15 asserts the CONTROL signal when counter 15 counts down to zero. This indicates that FIFO buffer 11 no longer holds any valid data to be transferred to register circuit 13. By causing breaking circuit 12 not to acknowledge the REQ signal, the data transfer between FIFO buffer 11 and register circuit 13 is effectively terminated.

Disadvantages are, however, associated with this prior art arrangement. One disadvantage is that in order to ensure that register circuit 13 is stopped in time to account for the worst case signal propagation of FIFO buffer 11, register circuit 13 cannot operate faster than FIFO buffer 11. This typically affects the data transfer rate between the two elements, which in turn affects the system performance of data transfer system 10.

In order to maximize the data transfer rate between FIFO buffer 11 and register circuit 13, one prior art solution is to allow counter 15 to assert the CONTROL signal when FIFO buffer 11 is almost empty. By doing so, register circuit 13 can transfer data at maximized transfer rate while still being able to stop the data transfer in time. One of the disadvantages of this prior art solution is that other arrangements are typically required to recover the remaining data from FIFO buffer 11 when the data transfer is stopped. Another disadvantage is that it is typically difficult to determine the appropriate threshold level at which counter 15 asserts the CONTROL signal to indicate FIFO buffer 11 is almost empty. If the threshold level is set at a relatively low level, register circuit 13 may not stop in time. If the threshold level is set at a relatively high level, FIFO buffer 11 may hold too much data when the data transfer is stopped.

SUMMARY AND OBJECTS OF THE INVENTION

One of the objects of the present invention is to provide a data transfer system with a maximized data transfer rate between two elements of the data transfer system.

Another object of the present invention is to provide a data transfer system that prevents data transfer between two elements of the system from occurring when the transmitting element is empty of data to be transferred.

Another object of the present invention is to provide a data transfer system that maintains a maximized data transfer rate between its two components and that includes a throttling circuit that prevents data transfer between the two components of the data transfer system when the transmitting component is empty of data to be transferred.

A further object of the present invention is to provide a throttling circuit in a data transfer system for controlling data transfer from a transmitting component to a receiving component such that the data transfer is prevented as soon as the transmitting component does not contain any valid data to be transferred.

A data transfer system includes a buffer for storing data to be transferred out of the buffer and a register circuit coupled to the buffer for receiving the data from the buffer. The buffer generates a first indication signal when the buffer is almost empty. The buffer generates a second indication signal when the buffer is empty. The register circuit generates a request signal to receive the data from the buffer. The data transfer system further includes a throttling circuit coupled to the buffer and the register circuit for throttling data transmission to the register circuit from the buffer when the buffer generates the first indication signal and for stopping data transmission to the register circuit from the buffer when the buffer generates the second indication signal. The throttling circuit receives the first and second indication signals and the request signal.

A data transfer system includes a buffer for storing a plurality of data packets to be transferred out of the buffer. The buffer generates a first indication signal before a last data packet of the data packets is transferred out of the buffer. The buffer generates a second indication signal after the last data packet is transferred out of the buffer. A register circuit is coupled to the buffer for receiving the data packets from the buffer. The register circuit generates a request signal to receive each of the data packets from the buffer. A throttling circuit is coupled to the buffer and the register circuit for controlling data transmission of the data packets from the buffer to the register circuit. The throttling circuit receives the first and second indication signals and the request signal. When each of the first and second indication signals is not asserted, the throttling circuit generates an acknowledge signal to the buffer to transfer one of the data packets to the register circuit from the buffer whenever the request signal is asserted. When the first indication signal is asserted while the second indication signal is not asserted, the throttling circuit deasserts the acknowledge signal for a predetermined time period to throttle the data transmission until the second indication signal is asserted. When the second indication signal is asserted, the throttling circuit maintains the acknowledge signal deasserted regardless of the request signal.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
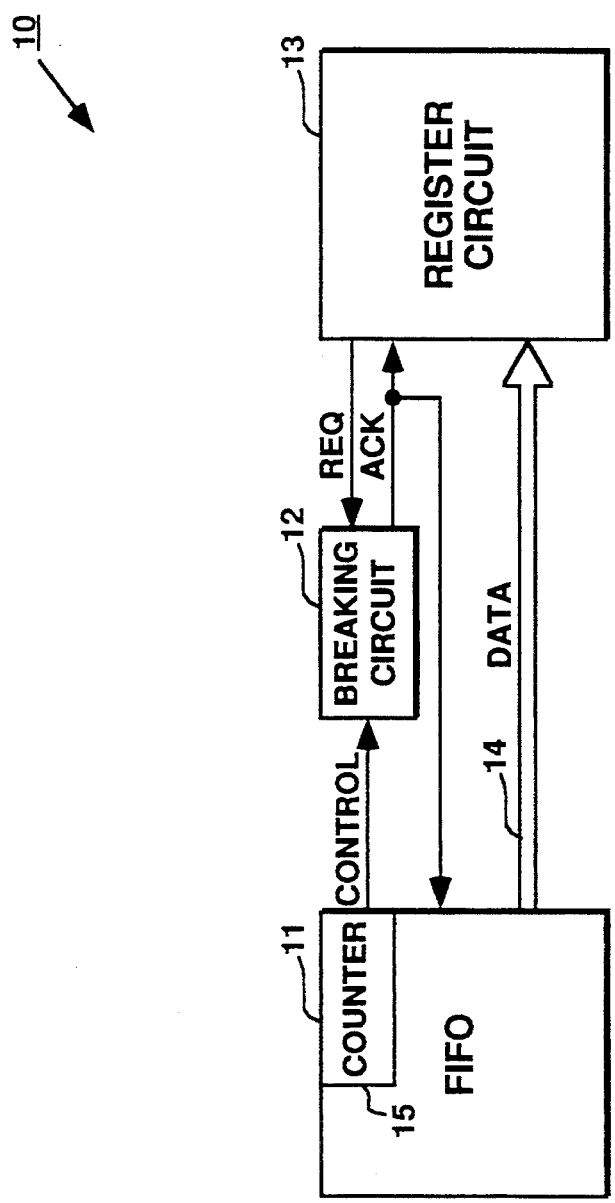
FIG. 1 is a block diagram of a prior art data transfer system.
Figure 2:
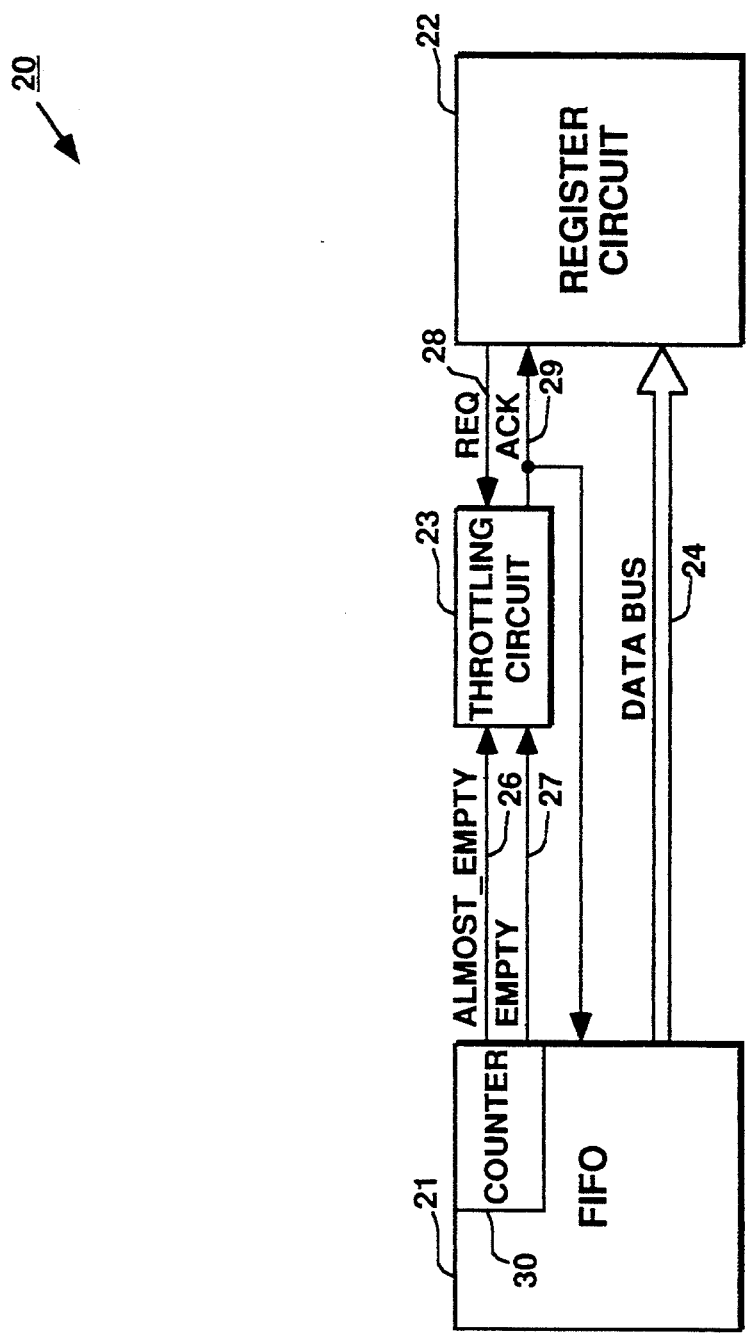
FIG. 2 is a block diagram of a data transfer system that includes a throttling circuit in accordance with one embodiment of the present invention.

FIG. 2 shows in block diagram form a data transfer system 20, which implements an embodiment of the present invention.

Data transfer system 20 can be implemented in any data processing system that has different data transfer rates between various components of the system. For one embodiment, data transfer system 20 is implemented in a computer system (not shown in FIG. 2). For a further embodiment, the computer system can be a graphics computer system, a personal computer system, a workstation computer, a minicomputer, a mainframe computer, or any other type of computer system. Alternatively, data transfer system 20 can be implemented in other types of data processing systems. For example, data transfer system 20 can be implemented in a printer system, a modem system, or a data communication system.

Data transfer system 20 includes a FIFO buffer 21 and a register circuit 22. FIFO buffer 21 is used to store data to be transferred to register circuit 22 via data bus 24 at a data transfer rate of register circuit 22. FIFO buffer 21 receives the data from an external circuit (not shown in FIG. 2) at a data transfer rate of the external circuit. The external circuit and register circuit 22 may be any two components of the data processing system (not shown in FIG. 2) in which data transfer system 20 is implemented. These two components are operating under different data transfer rates. This therefore requires an interface buffer that receives the data from the external circuit at the data transfer rate of the external circuit and sends the data to register circuit 22 at the data transfer rate of register circuit 22. FIFO buffer 21 thus serves as the interface buffer. Alternatively, FIFO buffer 21 may be other type of buffer circuit.

FIFO buffer 21 receives data from the external circuit under the data transfer rate of the external circuit. In other words, the external circuit determines the data transfer rate of FIFO buffer 21 in receiving the data from the external circuit.

FIFO buffer 21 also receives a request signal REQ from register circuit 22. Register circuit 22 is a self-timed circuit. Register circuit 22 generates the REQ signal to initiate each data fetch cycle. Register circuit 22 fetches one data word or packet during each data fetch cycle.

The REQ signal is used to control FIFO buffer 21 to send the stored data to register circuit 22. This means that the REQ signal controls the data transfer rate of FIFO buffer 21 to send the data to register circuit 22. The data transfer rate of FIFO buffer 21 to register circuit 22 is determined by the REQ signal.

FIFO buffer 22 also includes a counter 30. Counter 30 counts the number of data words or packets remaining in FIFO buffer 21. As described above, one data word or packet is transferred from FIFO buffer 21 to register 22 in one data read cycle. Register circuit 22 asserts the REQ signal to initiate the cycle. Whenever a data word or packet is transferred out of FIFO buffer 21, counter 30 down-counts one. Counter 30 generates an ALMOST_EMPTY signal and an EMPTY signal.

In one embodiment, counter 30 generates the ALMOST_EMPTY signal when counter 30 counts down to one. When counter 30 counts down to zero, counter 30 asserts the EMPTY signal. Alternatively, counter 30 can assert the ALMOST_EMPTY signal when counter 30 counts down to a number higher than one.

Data transfer system 20 also includes a throttling circuit 23. Throttling circuit 23 is connected between FIFO buffer 21 and register circuit 22. Throttling circuit 23 receives the ALMOST_EMPTY signal and the EMPTY signal from counter 30 of FIFO buffer 21. Throttling circuit 23 also receives the REQ signal from register circuit 22. Throttling circuit 23 generates an ACK signal to register circuit 22 and FIFO buffer 21. The ACK signal, when asserted, informs register circuit 22 that its request for data transfer has been accepted by FIFO buffer 21 and a data word or packet is to be transferred to register circuit 22. In addition, the ACK signal, when asserted, also deasserts the REQ signal which in turn deasserts the ACK signal. Meanwhile, the asserted ACK signal causes FIFO buffer 21 to transfer one data word or packet to register circuit 22 and decrements the count in counter 30 by one.

Counter 30 then determines if the count in counter 30 reaches one or not. If not, the ALMOST_EMPTY signal is not asserted. If the count in counter 30 is determined to reach one, counter 30 asserts the ALMOST_EMPTY signal. When the ALMOST_EMPTY signal is asserted, throttling circuit 23 throttles the data transfer of the last data word or packet from FIFO buffer 21 to register circuit 22 in response to the REQ signal. Throttling circuit 23 does this by delaying the generation of the ACK signal for a predetermined delay time when the REQ signal is asserted. This therefore throttles the data transfer from FIFO buffer 21 to register circuit 22. Throttling circuit 23 also throttles the response time of the ACK signal to the REQ signal for the purpose of allowing the EMPTY signal to be asserted in time to stop the data transfer after the last data word or packet is transferred.

When the last data word or packet is transferred, counter 30 then asserts the EMPTY signal to throttling circuit 23. With the EMPTY signal asserted, throttling circuit 23 prevents the data transfer between FIFO buffer 21 and register circuit 22. Throttling circuit 23 and its operation to effectively stop the data transfer between FIFO buffer 21 and register circuit 22 is described in more detail below, in conjunction with FIG. 3.

Figure 3:
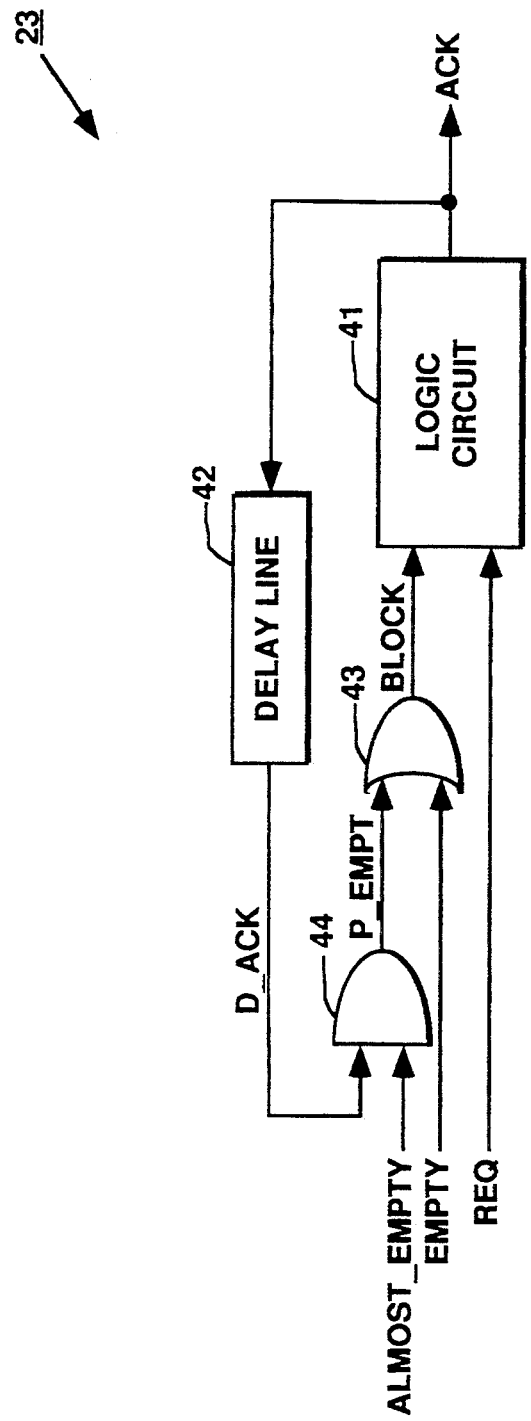
FIG. 3 shows the circuit of the throttling circuit of FIG. 2.

Referring to FIG. 3, the circuit of throttling circuit 23 of FIG. 2 is shown that includes a logic circuit 41, a delay line circuit 42, an OR gate 43, and an AND gate 44. AND gate 44 has an input coupled to the output of delay line circuit 42 for receiving a D_ACK signal and an input for receiving the ALMOST_EMPTY signal. The D_ACK signal is a delayed signal of the ACK signal. AND gate 44 outputs a P_EMPT signal to one input of OR gate 43. The other input of OR gate 43 is the EMPTY signal. OR gate 43 outputs a BLOCK signal to logic circuit 41. The other input of logic circuit 41 receives the REQ signal. Logic circuit 41 outputs the ACK signal.

Logic circuit 41 is used to pass the REQ signal to become the ACK signal when the BLOCK signal is logically inactive low. When the BLOCK signal and the REQ signal are both not asserted, the ACK signal is not asserted. When the BLOCK signal is active high before the REQ signal goes logically high, the ACK signal is deasserted (i.e., inactive low). The ACK signal will remain deasserted until the BLOCK signal is deasserted. This means that once the ACK signal is deasserted by the logical high BLOCK signal, the ACK signal is kept deasserted regardless of the REQ signal until the BLOCK signal is deasserted. Logic circuit 41 can be implemented by any known circuit.

For one embodiment, logic circuit 41 is implemented by a mutual-exclusion logic element. Alternatively, logic circuit 41 can be implemented by other known logic circuits.

As can be seen from FIG. 3, delay line circuit 42 receives the ACK signal and generates the D_ACK signal. The D_ACK signal is the delayed signal of the ACK signal. Delay line circuit 42 delays the ACK signal for a predetermined delay time to generate the D_ACK signal. Delay line circuit 42 can be implemented by any known delay line circuit or delay circuit. For example, delay line circuit 42 can be implemented by a number of inverters or latches connected in series, each having a specified amount of delay. For a further embodiment, delay line circuit 42 is a delay line circuit with a programmable delay.

Delay line circuit 42 applies the predetermined delay time to the ACK signal to generate the D_ACK signal. The predetermined delay time is set to a time value within which the ALMOST_EMPTY signal and the EMPTY signals are both asserted. This ensures that the ACK signal will not be asserted after the last data word or packet is transferred. In addition, the predetermined delay time also causes the data transfer to be throttled because it delays the assertion of the ACK signal. This throttling, however, does not affect the data transfer of the last data word or packet from FIFO buffer 21 to register circuit 22 before the EMPTY signal is asserted.

As described above, the ALMOST_EMPTY signal is asserted as soon as FIFO buffer 21 (FIG. 2) only contains the last data word or packet to be transferred. When this occurs, the BLOCK signal is asserted only for the time during which the D_ACK signal is asserted. This blocks logic circuit 41 from asserting the ACK signal during the time period when the D_ACK signal is asserted. This may delay the generation of the ACK signal that may throttle the data transfer of the last data word or packet. When the D_ACK signal is then deasserted, logic circuit 41 can then assert the ACK signal in response to the REQ signal. This is due to the fact that the EMPTY signal is not generated at this time. Because the ALMOST_EMPTY signal is applied by the delayed signal of the ACK signal, there is a known time relationship between the two signals.

When the ACK signal is again asserted by the logically active REQ signal, the last data packet is then transferred out of FIFO buffer 21. This causes the EMPTY signal to be asserted. Before the EMPTY signal arrives at OR gate 43, logic circuit 41 is already disabled from further asserting the ACK signal. This is because the prior asserted ACK signal has caused the asserted ALMOST_EMPTY signal to pass through AND gate 44 to OR gate 43 which then asserts the BLOCK signal. Again, the BLOCK signal is asserted for the time period during which the D_ACK signal is asserted.

When the asserted EMPTY signal arrives at OR gate 43, the BLOCK signal is continued to be asserted by the asserted EMPTY signal. As described above, the EMPTY signal is always asserted within the predetermined delay time of delay line circuit 42. Once the BLOCK signal is asserted by the asserted EMPTY signal, it remains to be asserted until the EMPTY signal is deasserted.

Referring to FIGS. 2 and 3, during operation, when FIFO buffer 21 has more than two data packets or words to be transferred to register circuit 22, counter 30 does not assert the ALMOST_EMPTY and EMPTY signals. The REQ signal is periodically asserted to fetch data from FIFO buffer 21 to register circuit 22. Because the ALMOST_EMPTY and EMPTY signals are both not asserted, the BLOCK signal is deasserted. This causes the ACK signal to be periodically asserted in accordance with the REQ signal to fetch data from FIFO buffer 21 to register circuit 22.

When counter 30 counts that FIFO buffer 21 has less than two data words or packets to be transferred to register circuit 22, counter 30 asserts the ALMOST_EMPTY signal but maintains the EMPTY signal deasserted. When the ALMOST_EMPTY signal arrives at AND gate 44, it has to be qualified by the D_ACK signal in order to be applied to OR gate 43 to assert the BLOCK signal. In this case, whenever the REQ signal is asserted which leads to the assertion of the ACK signal, the ALMOST_EMPTY signal always subsequently asserts the BLOCK signal to deassert the ACK signal for the same time duration during which the ACK signal is asserted by the REQ signal. This throttles the data transfer between FIFO buffer 21 and register circuit 22 but does not stop the data transfer between the two elements.

As described above, the REQ signal, when asserted by register circuit 22, is only deasserted by the asserted ACK signal. Hence, if the BLOCK signal prevents the ACK signal from being asserted for certain period of time, the deassertion of the REQ signal may be delayed accordingly. This in turn prolongs the data read cycle between FIFO buffer 21 and register circuit 22 that is initiated by the REQ signal.

When, however, the asserted ACK signal causes the last data word or packet to be transferred to register circuit 22 from FIFO buffer 21, counter 30 generates the EMPTY signal. Due to the signal propagation delay and other processing delay, the asserted EMPTY signal may not be immediately applied to OR gate 43 when asserted. However, because the ALMOST_EMPTY signal is still asserted, the BLOCK signal is also asserted when the D_ACK signal again goes high. This logical high D_ACK pulse is the delayed logical high ACK signal for transferring the last data word or packet. This causes the BLOCK signal to be asserted even though the asserted EMPTY signal has not arrived at OR gate 43. Because delay line circuit 42 delays the ACK signal for the delay time within which the EMPTY signal will always arrive at OR gate 43. The BLOCK signal is ensured to remain asserted at the end of the logical high D_ACK pulse. Once the asserted EMPTY signal is applied to OR gate 43, logical circuit 41 maintains the ACK signal deasserted regardless of the REQ signal until after the EMPTY signal is deasserted.

For one embodiment, counter 30 deasserts the EMPTY and ALMOST_EMPTY signal when counter 30 is written with a new count of data packets or words. For another embodiment, counter 30 deasserts the EMPTY signal whenever a new data word or packet is written into FIFO buffer 21. For this embodiment, counter 30 deasserts the ALMOST_EMPTY signal whenever the data words or packets remaining in FIFO buffer 21 reaches two.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A data transfer system, comprising:
   (A) a buffer for storing data to be transferred, wherein the buffer generates a first indication signal when the buffer stores substantially a last data packet and a second indication signal when the buffer is empty;
   (B) a register circuit coupled to the buffer for receiving the data from the buffer by asserting a request signal;
   (C) a throttling circuit coupled to the buffer and the register circuit for (1) allowing transfer of the last data packet to the register circuit when the throttling circuit receives the first indication signal and (2) stopping data transmission from the buffer to the register circuit as soon as the last data packet is transferred and before the throttling circuit receives the second indication signal, wherein the throttling circuit asserts an acknowledge signal to deassert the request signal whenever a data packet has been transferred to the register circuit, wherein the throttling circuit further comprises
      (i) a delay circuit coupled to receive the acknowledge signal of a previously transferred data packet for delaying the acknowledge signal for a predetermined time period during which the last data packet is transferred;
      (ii) a logic gate coupled to the delay circuit and the register circuit for allowing the first indication signal to pass through only when the delayed acknowledge signal is asserted;
      (iii) an OR gate coupled to receive the second indication signal and an output of the logic gate;
      (iv) a logic circuit coupled to receive the request signal and an output of the OR gate for deasserting the acknowledge signal when the output of the OR gate is logically active regardless of the request signal.

2. The data transfer system of claim 1, wherein the logic circuit further includes a mutual exclusion logic circuit.

3. The data transfer system of claim 1, wherein the buffer further comprises a counter for counting the data stored in the buffer and for generating the first and second indication signals in accordance with count of the counter.

4. The data transfer system of claim 1, wherein the logic gate is an AND gate.

5. The data transfer system of claim 1, wherein the data transfer system is used in a computer system.

* * * * *